United States Patent
Asokan

(10) Patent No.: US 9,222,597 B2
(45) Date of Patent: Dec. 29, 2015

(54) TRANSFLOW VALVE WITH AN ISOLATION AND SWITCHING MECHANISM FOR DOUBLE BLOCK AND BLEED ARRANGEMENT

(71) Applicant: Flowserve Management Company, Irving, TX (US)

(72) Inventor: Sagadevapillai Palan Asokan, Singapore (SG)

(73) Assignee: Flowserve Management Company, Irving, TX (US)

( * ) Notice: Subject to any disclaimer, the term of this patent is extended or adjusted under 35 U.S.C. 154(b) by 0 days.

(21) Appl. No.: 14/208,674

(22) Filed: Mar. 13, 2014

(65) Prior Publication Data
US 2014/0261823 A1    Sep. 18, 2014

Related U.S. Application Data

(60) Provisional application No. 61/787,110, filed on Mar. 15, 2013.

(51) Int. Cl.
*G02F 1/00*     (2006.01)
*F16K 31/44*    (2006.01)
*F16K 11/14*    (2006.01)

(52) U.S. Cl.
CPC ............... *F16K 31/44* (2013.01); *F16K 11/14* (2013.01); *Y10T 137/87885* (2015.04)

(58) Field of Classification Search
CPC ....... F16K 11/14; F16K 11/166; F16K 31/44; B01D 35/12
USPC .................. 137/599.14, 599.15, 625.15, 628, 137/630.16; 210/340
See application file for complete search history.

(56) References Cited

U.S. PATENT DOCUMENTS

| | | | |
|---|---|---|---|
| 246,538 A | 8/1881 | Mullaney | |
| 1,107,635 A | 8/1914 | Wagner | |
| 1,400,424 A | 12/1921 | Derby | |
| 1,988,945 A | 1/1935 | Hansen | |
| 3,116,755 A * | 1/1964 | McNeal | 137/599.14 |
| 3,409,048 A | 11/1968 | Brown | |
| 3,679,060 A * | 7/1972 | Smith | 210/333.1 |

(Continued)

FOREIGN PATENT DOCUMENTS

GB    2454661    5/2009

OTHER PUBLICATIONS

The International Search Report and Written Opinion of the International Searching Authority for PCT/US2014/025796, date completed Aug. 21, 2014, date mailed Aug. 29, 2014.

*Primary Examiner* — John K Fristoe, Jr.
*Assistant Examiner* — Reinaldo Sanchez-Medina
(74) *Attorney, Agent, or Firm* — Miller Canfield Paddock and Stone; Mark L Maki

(57) ABSTRACT

A transfer valve system includes an improved double block and bleed transflow valve system which uses six valves and uses one single spindle interconnecting the inlet and outlet transflow valves, which valves also drive a gear train mechanism connecting all six valve stems. As such, by operating one main spindle connected to the two inlet and outlet transflow valves, all six valves of this double block and bleed configuration operate simultaneously and assure an uninterrupted flow of fluid from one device to another standby device. The transflow valve system also is formed of separable components to form both single and double block and bleed configurations.

20 Claims, 8 Drawing Sheets

(56) References Cited

U.S. PATENT DOCUMENTS

Figure 1:
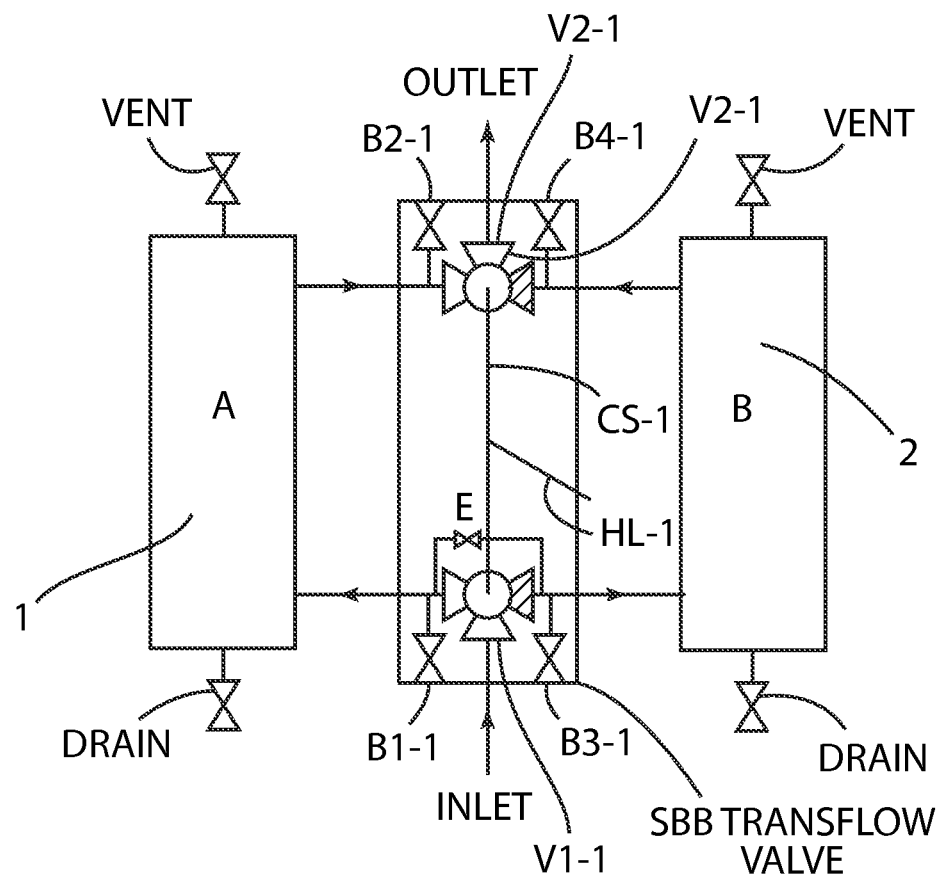

| | | | |
|---|---|---|---|
| 3,935,108 A * | 1/1976 | Forgues | 210/340 |
| 4,921,598 A * | 5/1990 | Desch | 210/136 |
| 5,129,420 A | 7/1992 | Johnson | |
| 5,390,694 A | 2/1995 | Zimmerly et al. | |
| 6,197,195 B1 * | 3/2001 | Booth et al. | 210/340 |
| 6,415,819 B1 | 7/2002 | Pas et al. | |
| 6,668,860 B1 | 12/2003 | Pas et al. | |

\* cited by examiner

TRANSFLOW VALVE WITH AN ISOLATION AND SWITCHING MECHANISM FOR DOUBLE BLOCK AND BLEED ARRANGEMENT

CROSS REFERENCE TO RELATED APPLICATIONS

This application asserts priority from provisional application 61/787,110 filed on Mar. 15, 2013, which is incorporated herein by reference.

FIELD OF THE INVENTION

The present invention relates to a transflow valve forming part of a bearing or mechanical seal support system or other support system for turbomachinery, and more particularly, to an isolation and switching mechanism for a transflow valve for such support systems.

BACKGROUND OF THE INVENTION

Bearing and mechanical seal support systems or other support systems for turbomachinery often may use fluid flow systems, which use various system devices to control the flow of a fluid, such as a gas or liquid through the support systems. The fluid flows through an operational system device but is switchable by a transflow valve to a standby system device. The fluid flow systems include a variety of fluid handling or transfer valves, which define independent fluid flow lines having flow passages through which flow is directed, controlled and in many cases diverted from one independent flow line to another fluid flow line. These fluid flow systems can include a variety of system components and devices that are used in a variety of different applications. For example, such system devices may include process filters, seal gas filters, fuel gas filters, lube oil filters, seal oil systems, scrubbers, gas-liquid separators, heat exchangers (cooling or heating) and gas or oil heaters used in any industry application. Accordingly, such devices are used with the bearing or mechanical seal support systems for turbomachinery where continuous and uninterrupted supply of a gas or liquid is needed for the main equipment and system.

In such applications, it is desirable for continuous fluid flow through the system, such that when one system device is spent or requires maintenance, another standby device can be brought on-line immediately so that the entire system need not be shut down. In one example, a fluid delivery system used for pumps, compressors or other types of rotating equipment for fluid delivery will include mechanical seals on the rotating equipment to seal such equipment, which seals are supplied with dry gas such as a barrier or buffer fluid in a conventional manner. It is necessary to continuously supply such gas during operation of the rotating equipment, wherein such gas will pass through the system devices, such as seal gas filters, that are provided in the gas supply system.

Thus, multiple or redundant system devices, such as gas seal filters, may be placed adjacent to one another, with at least one of the system devices being shutoff from the system, i.e. on standby, while at least one other system device is being used, i.e. is operational. Such a set-up allows a user or automated system to select which of the system devices are to be used at a certain time as the operational device and which devices are not to be used so as to serve as the standby device. Once an operational system device is spent or requires servicing, the operational device is shutoff from the system for replacement or maintenance and the standby device is put on line in its place.

To affect shutoff or switching between fluid treatment devices, transflow valves are used to isolate and switchover the system devices so that fluid flow switches from the operational device to the standby device.

Figure 2:
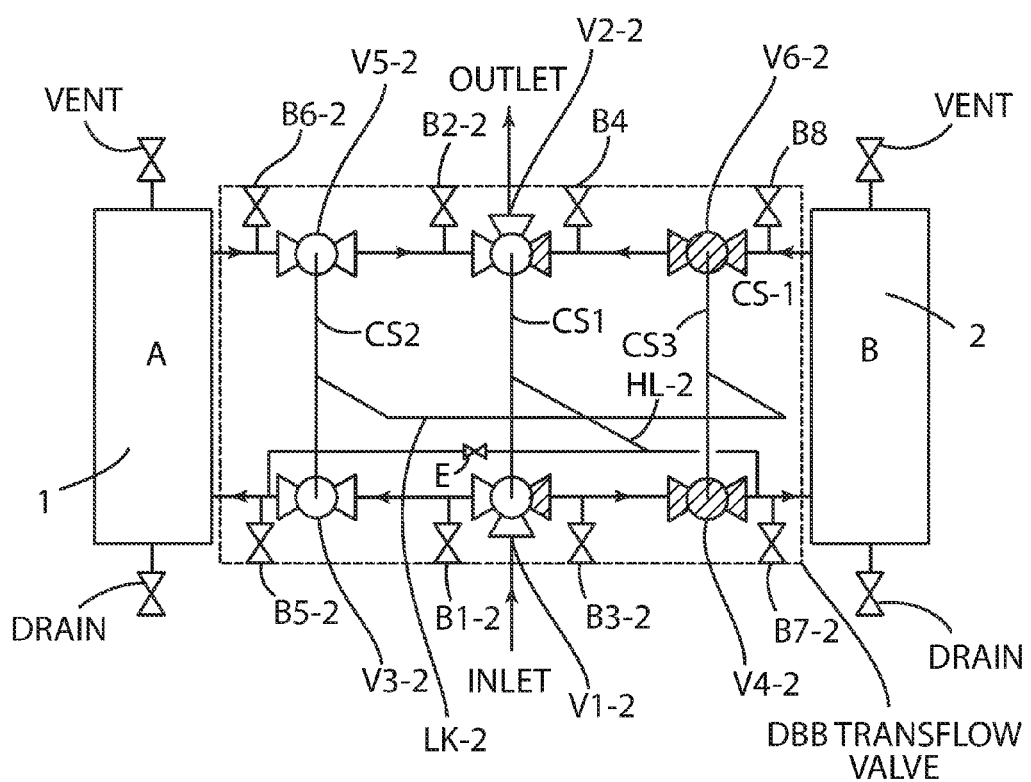

Conventional transflow valves can be constructed using three way ball valves such as that shown in FIG. 1 which are provided with one common spindle to operate the flow through the inlet and outlet sections of the transflow valves together in unison. Generally, there are two types of transflow valves used in industry, wherein one is a single block and bleed (SBB) valve (FIG. 1) and another one is a double block and bleed (DBB) valve (FIG. 2). The SBB transflow valve of FIG. 1 has one common spindle CS-1 connected to valve stems of an inlet transflow valve V1-1 and an outlet transflow valve V2-1. The DBB transflow valve of FIG. 2 has three valve spindles CS1, CS2, and CS3 linked together by a common handle assembly HL-2 to operate six transflow valves through one single operation.

More particularly, FIG. 1 is a schematic of a single block and bleed (SBB) transflow valve currently used in industry. In this drawing, A represents the equipment in operation, i.e. the operational device, and B represents the equipment in standby mode, i.e. the standby device. Each device has a vent and drain and is supplied by a respective inlet and outlet which are controlled through the valves V1-1 and V2-1, which in turn are connected to the main INLET or OUTLET. The valves V1-1 and V2-1 have respective valve stems connected to the common spindle CS-1 which is rotated manually by the handle HL-1.

The inlet and outlet for device A respectively have bleed valves B1-1 and B2-1 connected thereto, while the inlet and outlet for device B have respective bleed valves B3-1 and B4-1 connected thereto. A pressure equalizing valve E is also provided. Rotation of the spindle CS-1 by the handle HL-1 simultaneously switches the inlet and outlet transflow valves V1-1 and V2-1 between devices A and B. Hence, a fluid supply connected to device A is isolated from device B based on the valve position for valves V1-1 and V2-1, but the fluid supply can be switched over to device B and shut off from device A without affecting the flow to the devices downstream of the SBB transflow valve. Using valves V1-1 and V2-2 by operating the common spindle (CS-1) and the handle (HL-1), the device A is in operation and device B is in standby mode. Device B can be attended to for maintenance such as changing of the filter elements if the devices A and B were gas seal filters. Prior to the maintenance, the stand by side bleed valves B3-1 and B4-1 are normally closed but then opened to depressurize the device vessel 2 for safety prior to maintenance. By operating the valve position, the flow can be changed to switchover the flow to device B while device A becomes the standby device.

In the DBB transflow valve of FIG. 2, this also is a known device used in industry. Here again, A represents the equipment in operation and B represents the equipment in standby mode. This valve configuration uses a first block valve comprising inlet and outlet transflow valves V1-2 and V2-2, and a second block valve comprising inlet valves V3-2, V4-2 and outlet valves V5-2 and V6-2. These valves are connected in pairs by common spindles CS1, CS2 and CS3 which are all connected by handle linkage LK-2 operated by handle HL-2. Manual rotation of the handle HL-2 rotates the common spindles CS1, CS2 and CS3 through linkage LK-2 which in turn opens and closes the appropriate transflow valves. In this regard, the fluid supply may be connected to device A and isolated from device B based on the valve position for interconnected valve pairs V1-2/V2-2, V3-2/V5-2, and V4-2/V6-2. The fluid supply can be switched over to device B without affecting the flow to the devices downstream of the transflow valve assembly.

Therefore, main inlet and outlet valves V1-2 and V2-2 of the first block valve define the main switchover valve for diverting the fluid flow direction towards devices A or B, while the inlet and outlet valves V3-2 and V5-2 define the second block valve for device A and inlet and outlet valves V4-2 and V6-2 define the second block valve for device B. By operating the handle HL-2, all of these six valves are operated simultaneously. Notably, valves B1-2, B2-2, B3-2, B4-2, B5-2, B6-2, B7-2 and B8-2 are bleed valves, which are normally closed and selectively opened to depressurize the devices A or B during maintenance.

In another commercial design of a transflow valve for a double block and bleed (DBB) application (FIG. 3), this design is based on using a SBB design for first block valves (V1-3 and V2-3), which are connected by a common spindle CS and operated by a handle HL like in FIG. 1. This design uses separate second block valves (V3-3, V4-3, V5-3 and V6-3), which are independent valves operated by their own respective handle H3, H4, H5 and H6. B1-3, B2-3, B3-3, B4-3, B5-3, B6-3, B7-3 and B8-3 are bleed valves, which are normally closed and selectively opened to depressurize devices A or B during maintenance.

In operation, if any one of these transflow valves (V3-3, V4-3, V5-3 and V6-3) are operated incorrectly by being closed when it should be open, the process device A or B will lose the supply of fluid or may allow the fluid flow to flow in the wrong direction and cause an operational issue and unsafe maintenance. This arrangement depends on the skill set of the operator and a thorough understanding of the valves positions by the operators. Hence, this design is not a fool proof device and depends on the operator's skill and care.

It is an object of the invention to provide an improved transflow valve assembly, which overcomes disadvantages associated with known transflow valve designs.

The invention relates to an improved double block and bleed transflow valve which uses one single spindle interconnecting the inlet and outlet transflow valves with which valves also drive a gear train mechanism connecting all six valve stems. As such, by operating one main spindle connected to the two inlet and outlet transflow valves, all six valves of this double block and bleed configuration operate simultaneously through the common spindle and gear train mechanism and assure an uninterrupted flow of fluid from one device to another standby device.

Generally, the preferred design of the present invention includes two system devices and in particular, two fluid treatment devices such as gas seal filters, where inlet and outlet flow to and from the filters is controlled by respective inlet and outlet transfer valves, which selectively switch or transfer fluid flow from one filter to another. These system devices may be any type of such devices used with transflow valves, and it will be understood that the fluid transfer valves disclosed herein are usable with various types of turbomachinery devices which receive and transfer fluid that flows therethrough. For example, the inventive fluid transfer valves can be provided on the upstream and downstream sides of one or more fluid handling or flow devices to selectively switch or transfer flow of fluid from one device to the other.

Other objects and purposes of the invention, and variations thereof, will be apparent upon reading the following specification and inspecting the accompanying drawings.

BRIEF DESCRIPTION OF THE DRAWING FIGURES

Figure 3:
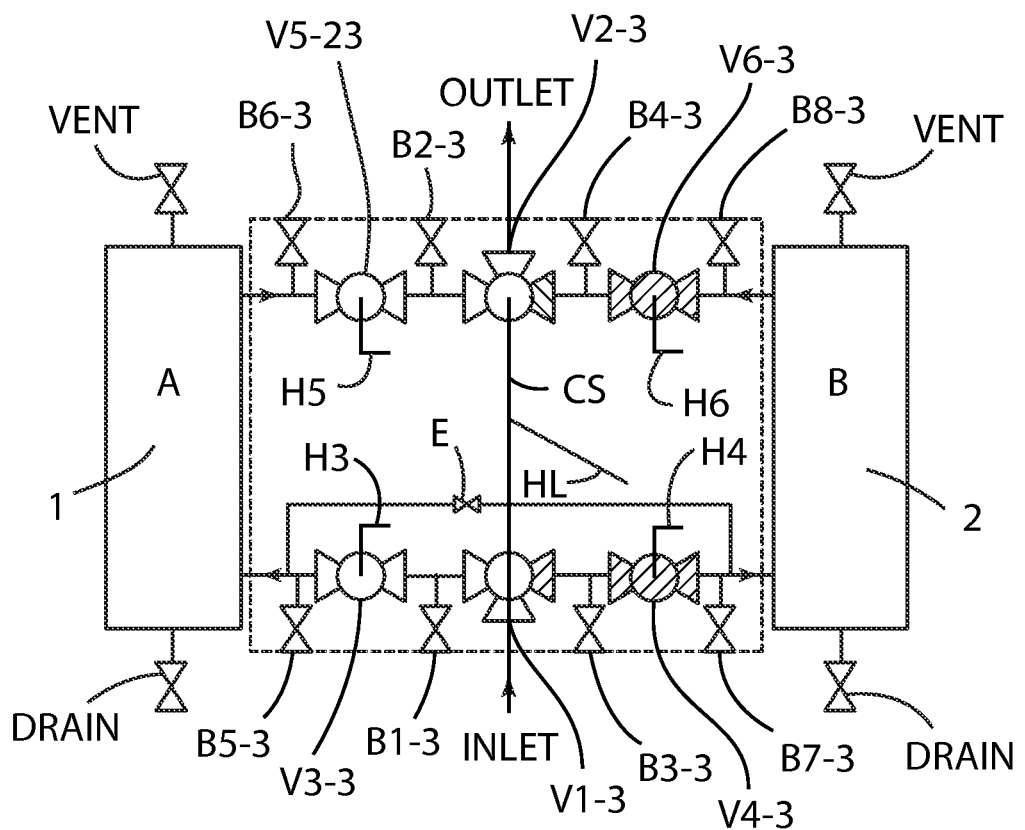
Figure 4:
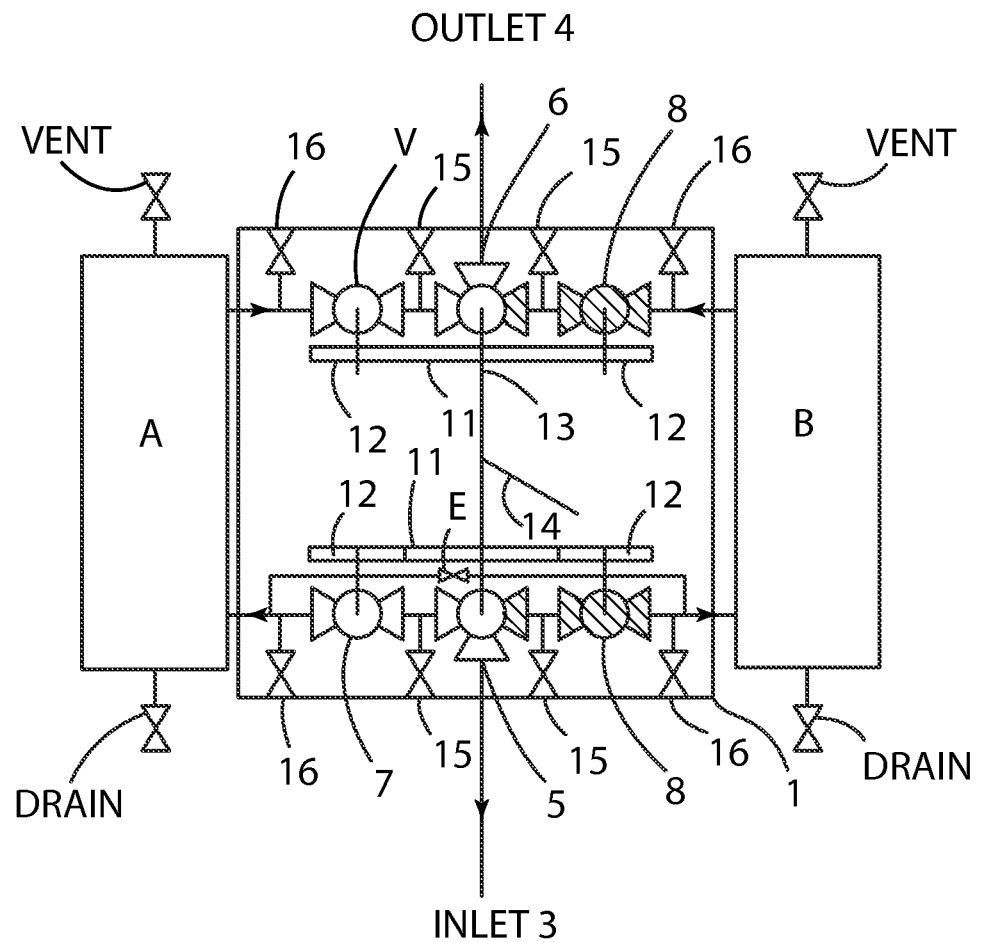
Figure 5:
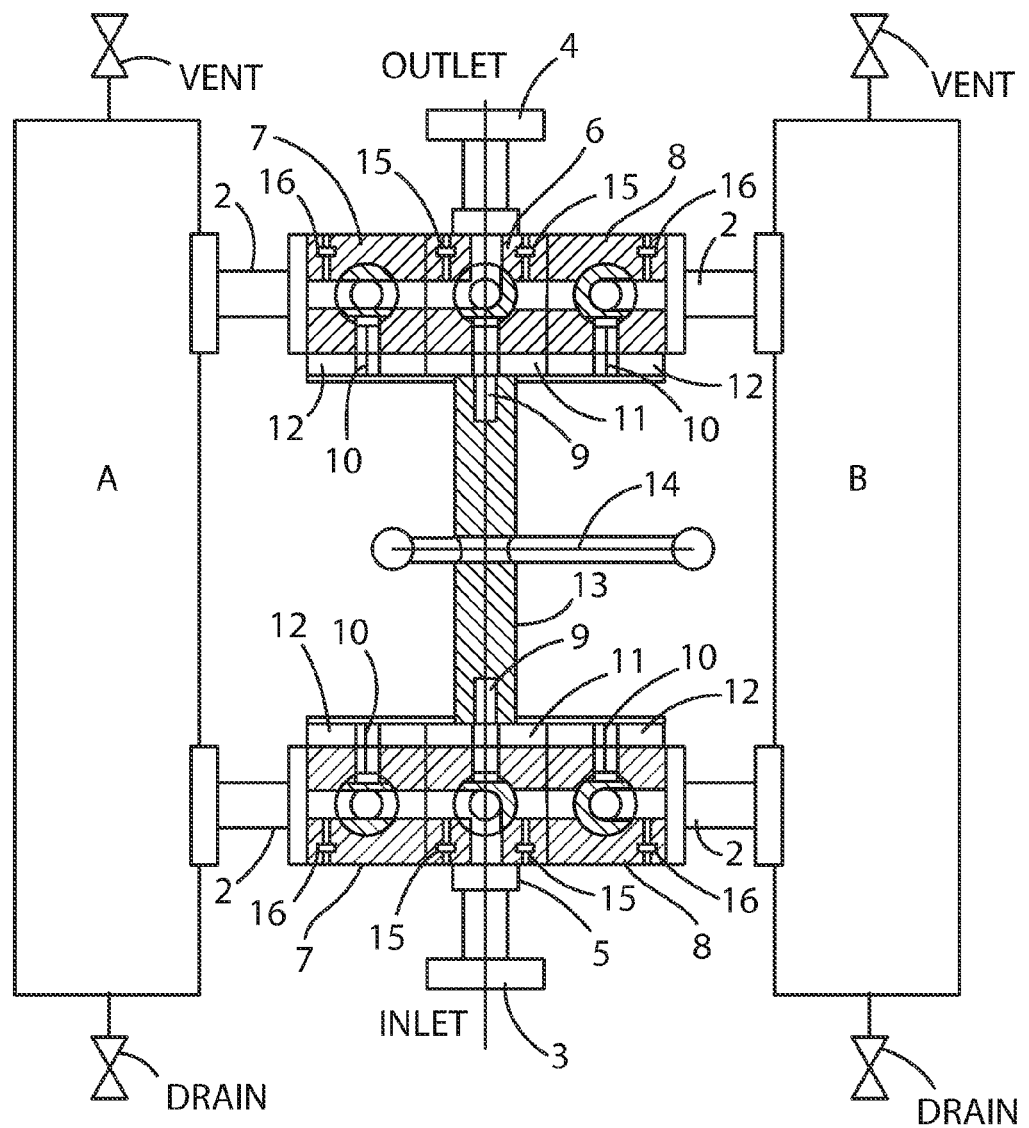
Figure 6:
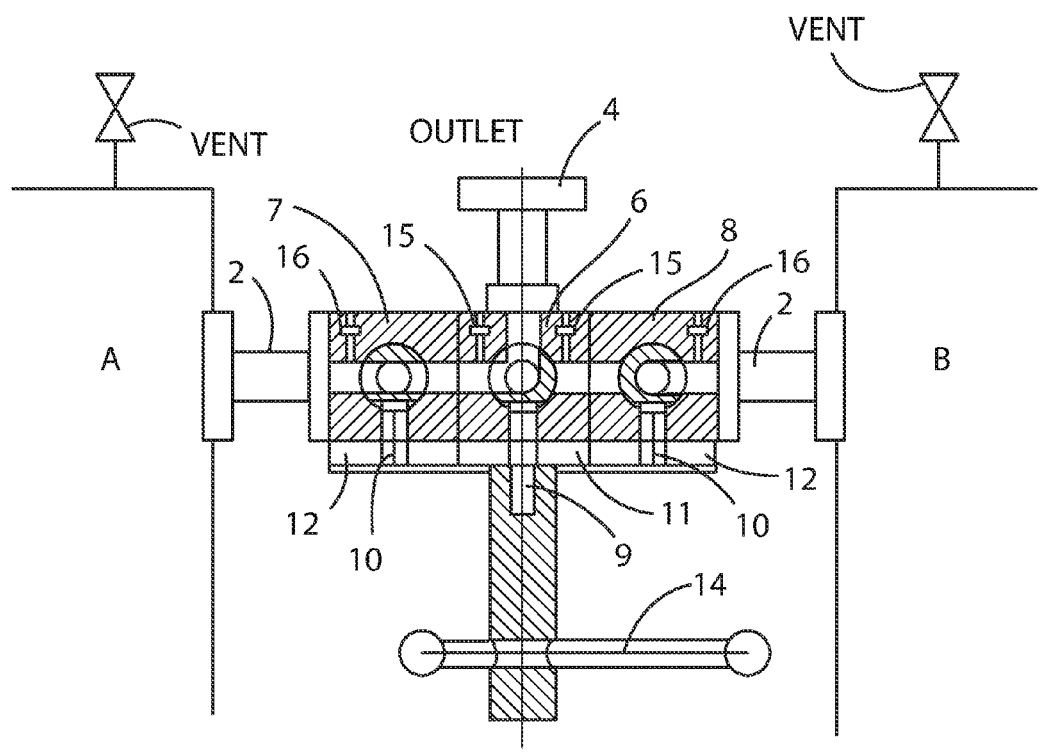
Figure 7:
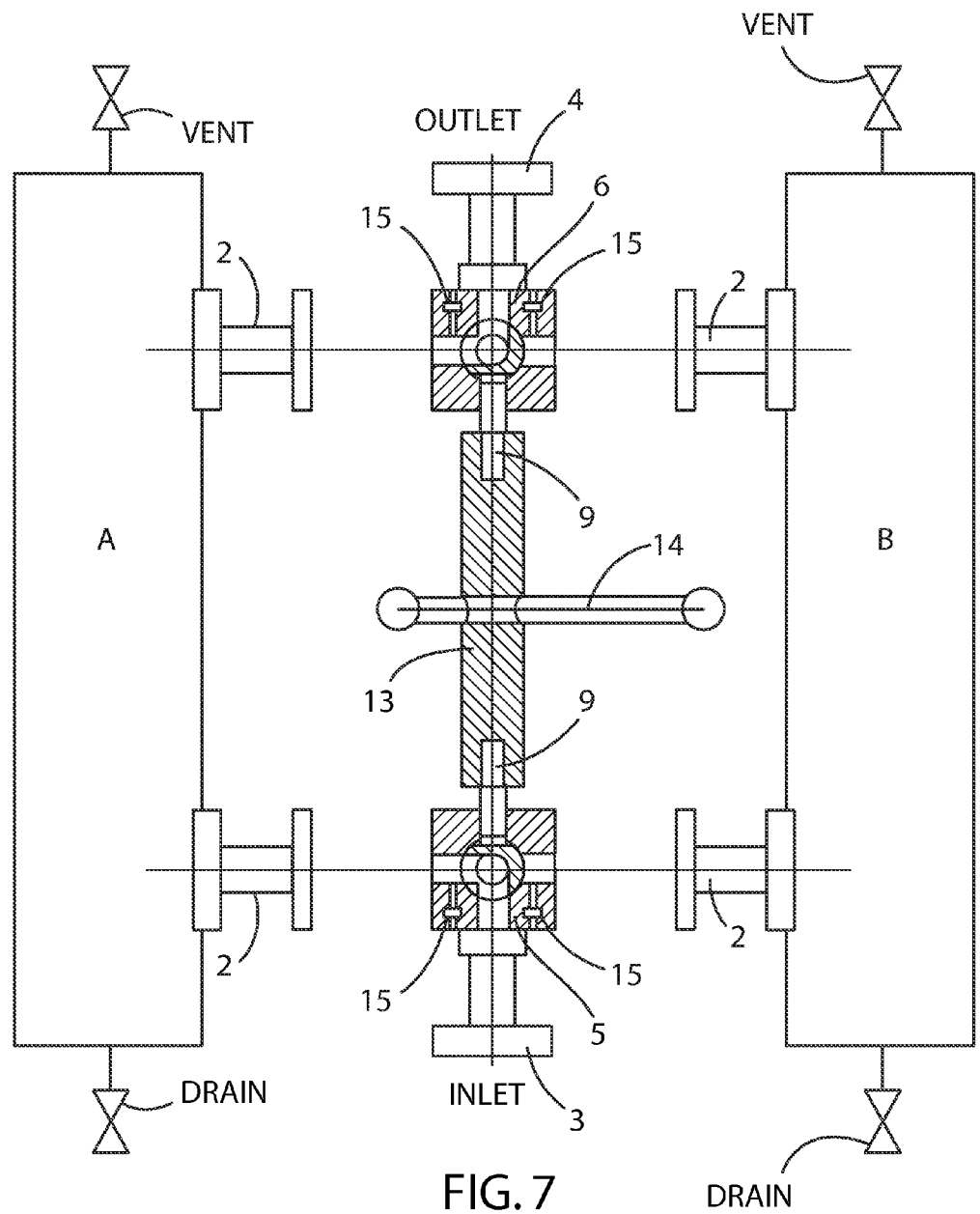
Figure 8:
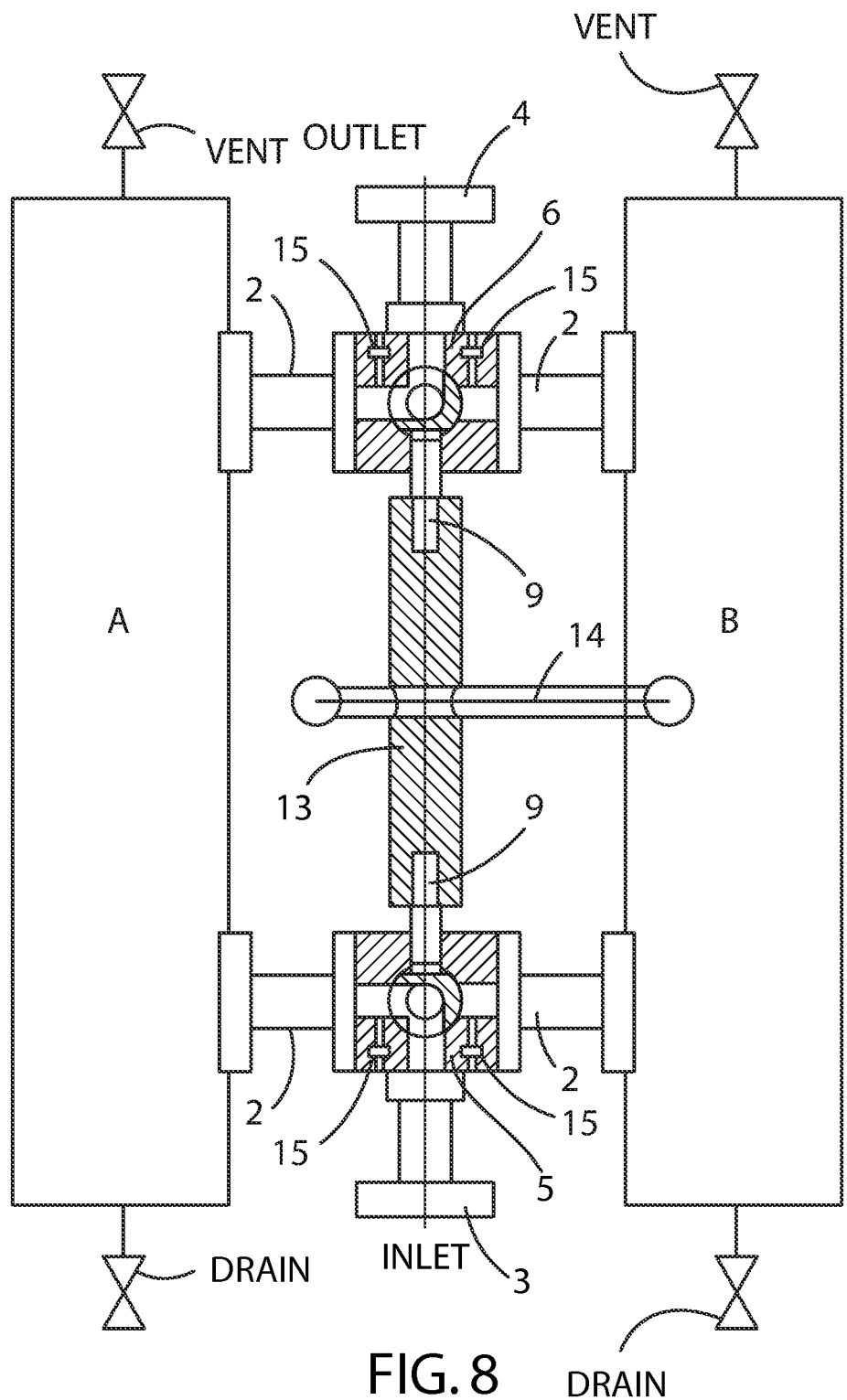

FIG. 1 is a schematic diagram of a single block and bleed transflow valve system.
FIG. 2 is a schematic diagram of a double block and bleed transflow valve system.
FIG. 3 is a schematic view of a further embodiment of a double block and bleed transflow valve system.
FIG. 4 is a schematic diagram of a double block and bleed transflow valve system, according to the present invention.
FIG. 5 is a detailed view thereof.
FIG. 6 is a enlarged partial view thereof.
FIG. 7 illustrates a first step in modifying the system, according to a modular construction thereof.
FIG. 8 shows a second step of the system modification.

Certain terminology will be used in the following description for convenience in reference only and will not be limiting. The words "up", "down", "right" and left" will designate directions in the drawings to which reference is made. The words "in" and "out" will refer to directions toward and away from, respectively, the geometric center of the device and designated parts thereof. The words "proximal" and "distal" will refer to the orientation of an element with respect to the device. Such terminology will include derivatives and words of similar import.

DETAILED DESCRIPTION

Referring to FIG. 4, a transflow valve assembly 1 of the present invention is shown in a double block and bleed configuration. As in the above figures, A represents the operational device and B represents the standby device wherein the devices A and B are connected to the transflow valve assembly 1 by respective pipe fittings 2. As will be described herein, these devices A and B are switchable in response to operation of the transflow valve assembly 1 of the present invention.

The inventive transflow valve assembly 1 is connected between devices A and B and is connected so as to receive system fluid through the inlet 3 and discharge such fluid to the outlet 4. In this double block and bleed configuration, a first pair of transflow valves 5 and 6 are provided, which are interconnected by a common spindle. These valves 5 and 6 may be ball valves or other suitable valves. Spindle 13 is rotatable manually by the handle 14. Therefore, manual rotation of the handle 14 rotates the spindle 13 which in turn drives the valve stems 9 of the transflow valves 5 and 6. Hence, these transflow valves 5 and 6 are movable, simultaneously to either direct flow of fluid into and out of the device A or else into in and out of device B. FIG. 5 illustrates the open condition of the valves 5 and 6 in white, while showing the closed passage side in dark shading or cross-hatching. It will be understood that the white and black representations are reversible when the valve is operated to change flow from device A and instead direct flow to device B.

These valves 5 and 6 also may be referenced as the main diverter valves for the fluid flow direction, which control the flow of the fluid either towards device A or towards device B.

Additionally, a set of block valves are provided in the double block configuration. As shown in this regard, a pair of block valves 7 are connected to one down-stream side of the diverter valves 5 and 6 and in turn connected to the device A as the inlet and outlet thereof. Appropriate bleed valves 15 and 16 are provided to release pressure there from and during maintenance.

A second pair of block valves 8 is also provided on the second side of the diverter valves 5 and 6 so as to control flow into and out of the device B. Additional bleed valves 15 and 16 are also provided in association with these block valves 8. To simultaneously drive all of the valves 5-8, the diverter valves 5 and 6 have their valve stems 9 (FIG. 5) each drivingly inter-connected with drive-gears 11, which drive-gears 11 are operatively connected to the spindle 13. Hence, rotation of the spindle 13 by the handle 14 also causes simultaneous rotation of the drive gears 11 about the axis of such spindle 13.

These gears 11 have gear teeth, which intermesh with additional driven gears 12 that are interconnected to the valve stems 10 (FIG. 5) of the block valves 7 and 8. Preferably, these gears 11 and 12 are spur gears, having intermeshing gear teeth. In this regard, one set of valves 6, 7 and 8 on the inlet side of the transflow valve assembly would be simultaneously driven by their respective drive gear 11 and driven gears 12 during rotation of the spindle 13. Similarly, the valves 6, 7 and 8 on the outlet side are also simultaneously operated by the inter-meshed gears 11 and 12 connected thereto. Therefore, operation of the handle 14, rotates the spindle 13 and transmits rotary motion to each set or gear set of gears 11 and 12, either on the inlet side or the outlet side, so as to turn the valve stems 9 and 10 and operate all six of the respective valves 5, 6, 7 and 8. With this arrangement, the two gear trains are operated by a single common spindle 13, and the one common spindle 13 and handle 14 enables operation of all six valves 5-8 simultaneously so that the flow of fluid changes from device A to device B or device B to device A, without interruption.

Referring to FIGS. 5 and 6, the transflow valves 5, 6, 7 and 8 are formed as modular blocks or modules, which are connected together by suitable fasteners. In the double block and bleed configuration of FIGS. 5 and 6, a first valve 5 or 6 is positioned between a respective pair of inlet or outlet valves 7 and 8 so that the valve flow paths flow either to the pipe fittings 2 connected to the device A or the pipe fittings 2 connected to the device B. By the provision of these six (6) valves, the flow can be directed either through the valves 7 or valves 8 in the same manner as described herein. Referring to FIG. 7, however, these same components may also be used to form a single block and bleed configuration. In this regard, the valve modules for valves 7 and 8 are omitted and only the central assembly, comprising the valves 5 and 6 is provided between the devices A and B. The pipe fittings 2 are then respectively connected to the opposite sides of the valve modules 5 and 6 and when interconnected, form the single block and bleed configuration seen in FIG. 8. In this construction, the central drive gears 11 can be removed from the valve stems 9 prior to installation of the spindle 13. Once assembled, the spindle 13 drives the valve stems 9 for each of the valves 5 and 6 to alternate operation between devices A and B. Hence, the same components may be used to form both of the valve configurations shown in FIGS. 5 and 8.

Referring to FIG. 5, a modular construction for the transflow valve assembly 1 comprises the six block valves 5, 6, 7 and 8, which control the inlet and outlet sides. Each valve 5, 6, 7 and 8 is formed as a valve module, which each have a modular construction and are removably engagable with each other by fasteners. These modules are used to build both a single block and bleed configuration SBB (FIG. 8) or a double block and bleed configuration DBB (FIGS. 5 and 6) from the same components.

In FIGS. 5-8, items 3 and 4 are the inlet and outlet flange adapters for connection of the process piping designed according to pressure rating and line size, and items 5 and 6 are first block or transflow valves for the inlet and outlet flow switchover. Items 7 and 8 are second block valves, which can be provided as additional modules that can be used only when a DBB arrangement is required. Item 9 is the main valve stem for each valve 5 and 6 wherein both of these stems 9 are connected together by spindle 13. Also, a drive gear 11 is installed on each valve stem 9 while the spindle is operated by handle 14 to rotate the valve stems 9 and actuate the valves 5 and 6.

Items 7 and 8 are block valves having basically the same design except that they are formed with a mirror image 7 for the left side and 8 for the right side. Item 10 is the valve stem for each valve 7 and 8, which are each equipped with a driven gear 12. The driven gear 12 is engaged with drive gear 11 constantly, and when the main handle 14 is operated between 0 to 90° (a one quarter turn), each drive gear 11 drives the respective driven gears 12 on both the left and right side through the same angle but in the opposite direction. Thus when the switchover or diverter valves 5 and 6 are operated, the second block valves 7 and 8 are operated.

As noted above, items 15 are first stage bleed valves and items 16 are second stage bleed valves. These bleed valves are used for venting the system for maintenance or purging purpose. This modular design allows for construction of the single block and bleed configuration of FIGS. 7 and 8. Alternatively, the same modular components may be used to construct the double block and bleed design of FIGS. 4-6. Further, the double block and bleed design of FIGS. 4-6 allows a single spindle 13 to be used to drive two separate gear trains formed of three gears 12/11/12 operating three valves 7/6/8 or 7/5/8. This provides an improved operation and construction for a double block and bleed transflow valve assembly.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. A transflow valve system comprising:
a first system device having a respective inlet and outlet for fluid;
a second system device having a respective inlet and outlet for fluid; and
a double block and bleed transflow valve assembly which comprises an inflowing first valve and an outflowing second valve which are connected to a main inlet and outlet for fluid and have a common spindle interconnecting the first and second valves to actuate said first and second valves by rotation of said spindle, said transflow valve assembly comprising third and fourth valves connected between the inlet and outlet of the first system device and the first and second valves, and fifth and sixth valves connected between the inlet and outlet of the second system device and the first and second valves, said first, third and fifth valves being operatively interconnected by a first set of gears and said second, fourth and sixth valves being operatively connected by a second set of gears, said first and second sets of gears being connected to said spindle and being operated by rotation of said spindle to simultaneously actuate each of said first to sixth valves between first and second operative conditions which direct fluid flow either to said first system device or said second system device to assure an uninterrupted flow of fluid from when switching between said first and second system devices.

2. The transflow valve system of claim 1, wherein said first and second sets of gears respectively comprise first and second drive gears, and said first and second valves respectively including said first and second drive gears that are connected to and actuated directly by said spindle.

3. The transflow valve system of claim 2, wherein said third to sixth valves include respective third to sixth driven gears that are driven by said first and second drive gears, said first drive gear actuating said third and fifth driven gears during rotation of said spindle.

4. The transflow valve system of claim 3, wherein said third to sixth valves include said respective third to sixth driven gears which are actuated directly by said first and second drive gears, said second drive gear actuating said fourth and sixth driven gears during rotation of said spindle.

5. The transflow valve system of claim 2, wherein said third to sixth valves include respective third to sixth driven gears actuated directly by said first and second drive gears, said second drive gear actuating said fourth and sixth driven gears during rotation of said spindle.

6. The transflow valve system of claim 1, wherein said first and second sets of gears comprises first to sixth gears operatively connected to said first to sixth valves, said first to sixth gears being rotatable with valve stems of said first to sixth valves.

7. The transflow valve system of claim 6, wherein said first to sixth gears and said third to sixth valves are removably engaged with said first and second valves to permit removal of said third to sixth valves to form a single block and bleed valve controlling said first and second system devices.

8. A transflow valve system comprising:
a first system device having a respective inlet and outlet for fluid;
a second system device having a respective inlet and outlet for fluid; and
a transflow valve assembly which comprises first and second valves which are connected to a main inlet and outlet for fluid and have a common spindle interconnecting said first and second valves to actuate said first and second valves by rotation of said spindle, said transflow valve assembly comprising third and fourth valves removably connectable between the inlet and outlet of the first system device and said first and second valves, and fifth and sixth valves removably connectable between the inlet and outlet of the second system device and said first and second valves in a double block and bleed valve configuration, wherein said first, third and fifth valves being operatively interconnected by a first set of gears and said second, fourth and sixth valves being operatively connected by a second set of gears, said first and second sets of gears being connectable to said spindle and being operated by rotation of said spindle to simultaneously actuate each of said first to sixth gears between first and second operative conditions which direct fluid flow either to said first system device or said second system device to assure an uninterrupted flow of fluid from when switching between said first and second system devices; and
said first and second sets of gears comprising first to sixth gears operatively connected to said first to sixth valves, such that said first to sixth gears are rotatable with said first to sixth valves, said first to sixth gears and said third to sixth valves being removably engaged with said first and second valves to permit construction of a single block and bleed valve configuration solely using said first and second valves and said valve to control said first and second system devices.

9. The transflow valve system of claim 8, wherein said first to sixth gears are connected to respective valve stems of said first to sixth valves.

10. The transflow valve system of claim 9, wherein each of said first to sixth gears is removably mounted on said respective valve stems to permit reconfiguration of said valve assembly between a double block and bleed valve configuration and a single block and bleed valve configuration.

11. The transflow valve system of claim 8, wherein bleed valves are provided in said first to sixth valves to selectively release pressure there from during switching between said first and second system devices.

12. The transflow valve system of claim 8, wherein said first to sixth valves are ball valves.

13. The transflow valve system of claim 8, wherein said spindle is manually rotatable by a handle.

14. The transflow valve system according to claim 8, wherein said first to sixth gears are spur gears having intermeshing gear teeth.

15. A transflow valve system comprising:
a first system device having a respective inlet and outlet for fluid;
a second system device having a respective inlet and outlet for fluid; and
a transflow valve assembly which comprises first and second valves which are connected to a main inlet and outlet for directing fluid into and out of a selected one of said first and second system devices, a common spindle interconnected to said first and second valves, which is movable to actuate said first and second valves, said transflow valve assembly comprising third and fourth valves removably connectable between the inlet and outlet of the first system device and said first and second valves, and fifth and sixth valves removably connectable between the inlet and outlet of the second system device and said first and second valves, said first to sixth valves being formed as modules, which are removably fastened together with adjacent valves and said first and second system devices;
said first, third and fifth valves being operatively interconnected by a first set of gears and said second, fourth and sixth valves being operatively connected by a second set of gears, said first and second sets of gears comprising first to sixth gears operatively connected to said first to sixth valves, such that rotation of said third to sixth gears actuates said third to sixth valves, said first and second gears being rotated in unison by rotation of said handle which rotates said third to sixth gears simultaneously so that a flow of fluid switches between said first and second system devices without interruption.

16. The transflow valve system according to claim 15, wherein said first to sixth gears and said third to sixth valves are removably engaged with said first to sixth valves to permit selective removal of said third to sixth valves.

17. The transflow valve system according to claim 15, wherein said first and second gears are connected to said spindle and operated by rotation of said spindle to simultaneously actuate each of said first to sixth gears between first and second operative conditions to selectively switch a fluid flow between said first and second system devices.

18. The transflow valve system according to claim 15, wherein said first to sixth valves include respective valve stems having said first to sixth gears removable mounted on said valve stems.

19. The transflow valve system according to claim 15, wherein bleed valves are provided in said first to sixth valves to selectively release pressure there from during switching between said first and second system devices.

20. The transflow valve system according to claim 19, wherein said first to sixth valves are ball valves, said spindle is manually rotatable by a handle, and said first to sixth gears are spur gears having intermeshing gear teeth.

* * * * *